J. O. Woodward,
Making Hoops.
Nº 15,399.   Patented July 22, 1856.
Fig: 1.
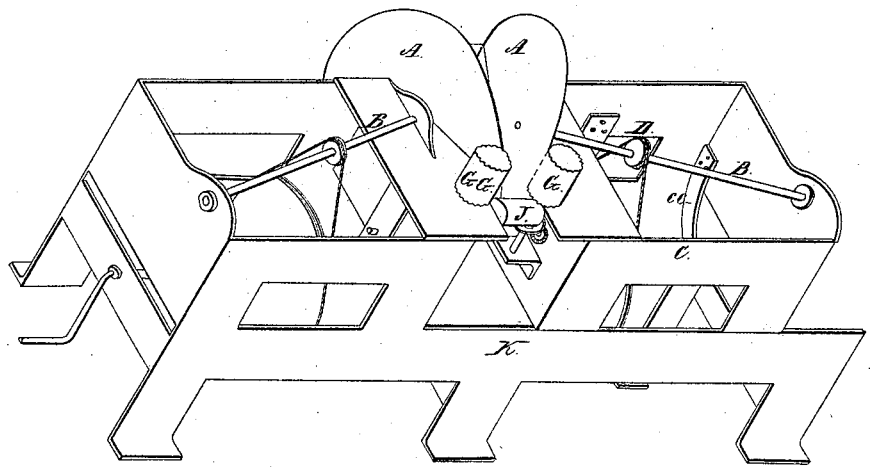
Fig: 2.
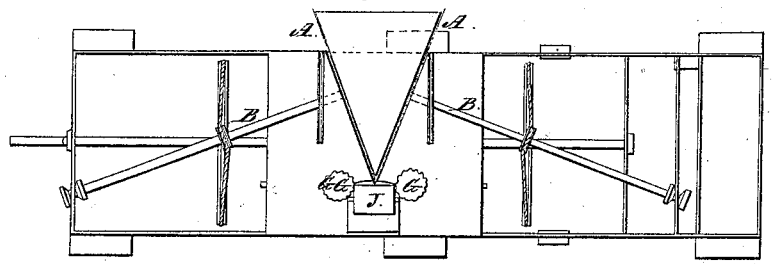
Fig: 3.
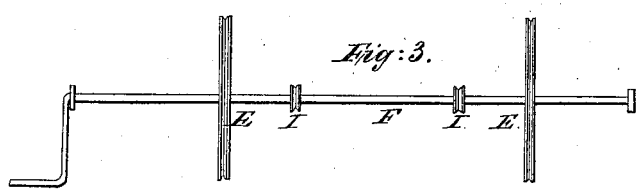
Fig: 4.
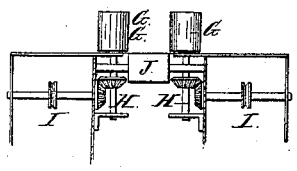

UNITED STATES PATENT OFFICE.

JAMES O. WOODWARD, OF TAUNTON, MASSACHUSETTS.

MACHINE FOR SAWING COOPERS' HOOPS.

Specification of Letters Patent No. 15,399, dated July 22, 1856.

*To all whom it may concern:*

Be it known that I, JAMES O. WOODWARD, of Taunton, in the county of Bristol and Commonwealth of Massachusetts, have invented a new and useful Improvement in Machines for Sawing Hoops; and I do hereby declare that the following is a full, clear, and exact description of the construction and operation of the same, reference being had to the annexed drawings, making a part of this specification, in which—

Figure 1 is a perspective view, Fig. 2 is a longitudinal elevation, and Figs. 3 and 4 are detached sections of the machine.

The nature of my invention consists in the arrangement of two circular saws for sawing hoops from irregular or crooked hoop poles, one of which saws is stationary and the other movable in order to saw various sizes of hoops. The two shafts hold the saws at the inner end of each, being placed on an angle, viz. varying from a straight line, so that two edges of said saws run or operate near together and the two opposite edges of said saws will run or operate wide apart. Thus the saws will take out a part of the center of the hoop pole and leave the outside fit for use. The object in having two circular saws, instead of one, is, inasmuch as the hoop poles may be of different sizes, and by using two circular saws at the same time, the two outer sides of the hoop pole will produce two hoops of nearly equal dimensions. The two circular saws will take out a part of the center of the hoop pole. The two hoops that are separated on the outer sides of the pole will be fit for use. One saw is movable, so as to extend or contract according to the inequalities of the surface of the knotty or irregular material. The movable saw governs the irregularity of the hoop pole as it progresses between the corrugated rollers to the saws. The difference in having two saws as above stated in lieu of one is because with two saws two hoops are made and with one saw it has to pass through twice to do the same work and not so perfect with one as with two saws.

References to the drawing:—A A, the two circular saws; B B, the two shafts with a circular saw attached to each; C, the movable frame with one saw attached; C C, the spring to keep the movable frame C in its proper place; D D, two pulleys; F, main shaft, to which is affixed two pulleys or drums marked E E, which, with the aid of the two pulleys D D, the saws are driven; G G and G, two perpendicular corrugated rollers for feeding the hoop pole to the saws; G G, the corrugated roller, may be moved and fixed, so as to govern the thickness of the hoop required; H H, bevel gearing for feed rolls G G and G; I I, pulleys for driving bevel gearing H H; J, friction roll in front of saws; K, main frame of the machine.

What I claim as my improvement, and desire to secure by Letters Patent, is—

The new arrangement and operation of two circular saws for sawing irregular or crooked hoop poles, and the two shafts with the saws attached, at the inner ends thereof, being placed on an angle so that two edges of said saws run or operate near together, and the two opposite edges of said saws will run or operate wide apart.

JAMES O. WOODWARD.

Witnesses:
C. I. REED,
A. BASSETT.